United States Patent
Dallos, Jr. et al.

(10) Patent No.: US 10,442,400 B2
(45) Date of Patent: Oct. 15, 2019

(54) WIPER ASSEMBLY AND METHOD

(71) Applicant: GM GLOBAL TECHNOLOGY OPERATIONS LLC, Detroit, MI (US)

(72) Inventors: Robert Dallos, Jr., Canton, MI (US); Gregory A. Castillo, Windsor (CA); Thomas W. Cox, Lapeer, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/340,639

(22) Filed: Nov. 1, 2016

(65) Prior Publication Data

US 2018/0118168 A1    May 3, 2018

(51) Int. Cl.
| | |
|---|---|
| *B08B 1/00* | (2006.01) |
| *B60S 1/08* | (2006.01) |
| *B08B 3/10* | (2006.01) |
| *B60S 1/04* | (2006.01) |
| *B60S 1/58* | (2006.01) |

(52) U.S. Cl.
CPC ............... *B60S 1/08* (2013.01); *B08B 1/001* (2013.01); *B08B 3/10* (2013.01); *B60S 1/0466* (2013.01); *B60S 1/583* (2013.01)

(58) Field of Classification Search
CPC ... B08B 1/001; B08B 3/10; B60S 1/08; B60S 1/0466; B60S 1/583
See application file for complete search history.

(56) References Cited

U.S. PATENT DOCUMENTS

| | | | |
|---|---|---|---|
| 4,852,901 A | 8/1989 | Beasley et al. | |
| 6,222,443 B1 | 4/2001 | Beeson et al. | |
| 7,108,754 B2 * | 9/2006 | Franco | B60S 1/482 134/34 |
| 7,304,443 B2 * | 12/2007 | Argo | B60S 1/481 15/250.05 |
| 7,574,769 B1 * | 8/2009 | Nemeth | B60R 1/0602 15/250.003 |
| 8,888,121 B2 | 11/2014 | Trevino et al. | |
| 9,368,033 B2 * | 6/2016 | Reilhac | G08G 1/09623 |
| 9,466,988 B2 | 10/2016 | Deyaf et al. | |
| 9,496,732 B2 | 11/2016 | Partovi | |
| 9,834,133 B2 | 12/2017 | Bean | |
| 9,852,843 B2 | 12/2017 | Davis | |
| 10,164,392 B1 | 12/2018 | Scheim | |
| 2008/0036927 A1 | 2/2008 | Sitter et al. | |

(Continued)

OTHER PUBLICATIONS

USPTO, Non Final Office Action issued in U.S. Appl. No. 15/644,055, dated Feb. 1, 2019.

(Continued)

*Primary Examiner* — Alexander Markoff
(74) *Attorney, Agent, or Firm* — Lorenz & Kopf, LLP

(57) ABSTRACT

A wiper system incorporates a wiper motor provided with a wireless interface to provide electric power and control signals to the wiper motor. Thus, a direct electric/signal wire connection to the wiper motor is eliminated. A wireless transmitter may be provided within a first body portion of a vehicle and a wireless receiver and a wiper motor are provided in a second body portion of the vehicle. The second body portion may be moveable relative to the first body portion, such as, for example, a lift gate moving relative to a body opening.

20 Claims, 2 Drawing Sheets

(56) References Cited

U.S. PATENT DOCUMENTS

| | | | |
|---|---|---|---|
| 2008/0100137 A1* | 5/2008 | Kwon | B60S 1/08 307/10.1 |
| 2009/0216402 A1* | 8/2009 | Kwon | B60S 1/08 701/36 |
| 2009/0248243 A1* | 10/2009 | Kwon | B60S 1/08 701/36 |
| 2011/0197381 A1* | 8/2011 | Nelson | B60S 1/3801 15/103 |
| 2011/0197387 A1* | 8/2011 | Nelson | B60S 1/08 15/250.361 |
| 2012/0024081 A1 | 2/2012 | Baker | |
| 2012/0032632 A1 | 2/2012 | Soar | |
| 2013/0020879 A1 | 1/2013 | Kihara et al. | |
| 2013/0069865 A1 | 3/2013 | Hart et al. | |
| 2013/0124011 A1* | 5/2013 | Kwon | B60S 1/0807 701/2 |
| 2014/0070624 A1 | 3/2014 | Kim et al. | |
| 2014/0252813 A1* | 9/2014 | Lee | H02J 17/00 297/180.12 |
| 2015/0003569 A1 | 1/2015 | Ji | |
| 2015/0151714 A1* | 6/2015 | Kamiya | B60R 16/02 701/49 |
| 2015/0251584 A1* | 9/2015 | Deyaf | H04B 5/0037 307/10.8 |
| 2016/0014206 A1 | 1/2016 | Isobe | |
| 2016/0272161 A1* | 9/2016 | Berry | B60S 1/3805 |
| 2017/0124787 A1 | 5/2017 | Devlin | |
| 2018/0241134 A1 | 8/2018 | Kang | |

OTHER PUBLICATIONS

USPTO, Notice of Allowance issued in U.S. Appl. No. 15/632,770, dated Sep. 24, 2018.
USPTO, Final Office Action issued in U.S. Appl. No. 15/626,543, dated Aug. 16, 2018.
USPTO, Non-final Office Action issued in U.S. Appl. No. 15/644,055, dated Jan. 23, 2018.
USPTO, Non-final Office Action issued in U.S. Appl. No. 15/626,543, dated Feb. 16, 2018.
USPTO, Non-final Office Action issued in U.S. Appl. No. 15/632,770, dated Jun. 26, 2017.
USPTO, Final Office Action issued in U.S. Appl. No. 15/644,055, dated Oct. 26, 2018.

* cited by examiner

WIPER ASSEMBLY AND METHOD

TECHNICAL FIELD

This invention generally relates to wiper systems for a vehicle, and more particularly, this invention relates to a wirelessly powered wiper system and method of wirelessly powering a wiper system of a vehicle.

BACKGROUND

Wiper systems for road vehicles are designed to operate with a high level of performance and reliability. The wiper system ensures the forward looking windshield and in some installations the rear glass or back lite are clear of water, ice and snow that may be encountered during inclement driving conditions.

Common to wiper systems is one or more motor driven wiper arms that are fitted with wiper elements or wiper blades. The wiper arms are driven by the wiper motor to move in a predetermined pattern so that the wiper blades clear the windshield or rear glass surface.

The wiper motor requires electric power to operate. In existing implementations, the wiper motor requires a direct electrical/signal connection provided by a wiring harness. For all wiper systems, the need to provide electric power to the wiper motor complicates the design/packaging and installation processes. Providing a wiring harness to a rear wiper motor is particularly difficult often requiring pass through grommets to communicate the wiring harness through body panels and as well providing wiring on the exposed, "wet" side of the vehicle body panels. Complicated wiring arrangements often leads to reduced reliability and increased warranty issues.

Accordingly, it is desirable to provide wiper systems that simplify the connection of the wiper motor with the vehicle electrical systems. It is further desirable to provide vehicles incorporating such wiper systems. Furthermore, other desirable features and characteristics of the present invention will become apparent from the subsequent detailed description and the appended claims, taken in conjunction with the accompanying drawings and the foregoing technical field and background.

SUMMARY

Wiper systems incorporate wiper motors provided with a wireless interface to provide electric power and control signals to the wiper motor, in accordance with herein described, non-limiting embodiments of the invention. Thus, a direct electric/signal wire connection to the wiper motor is eliminated.

In another non-limiting exemplary embodiment, a wireless transmitter is provided within a first body portion of a vehicle and a wireless receiver and a wiper motor are provided in a second body portion of the vehicle. The second body portion may be moveable relative to the first body portion, such as, for example, a lift gate moving relative to a body opening of the first body portion.

In another non-limiting example, a vehicle is provided. The vehicle includes a wiper system that includes a wiper motor. The wiper motor is provided with a wireless interface to provide electric power and control signals to the wiper motor.

In another non-limiting example, a wiper system is provided that eliminates difficult wired power connections, allowing for improved rear wiper loading during vehicle assembly. Such wiper systems may further eliminate the need for grommets and other water tight connectors to route wire between a lift gate and header portion of a body opening.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
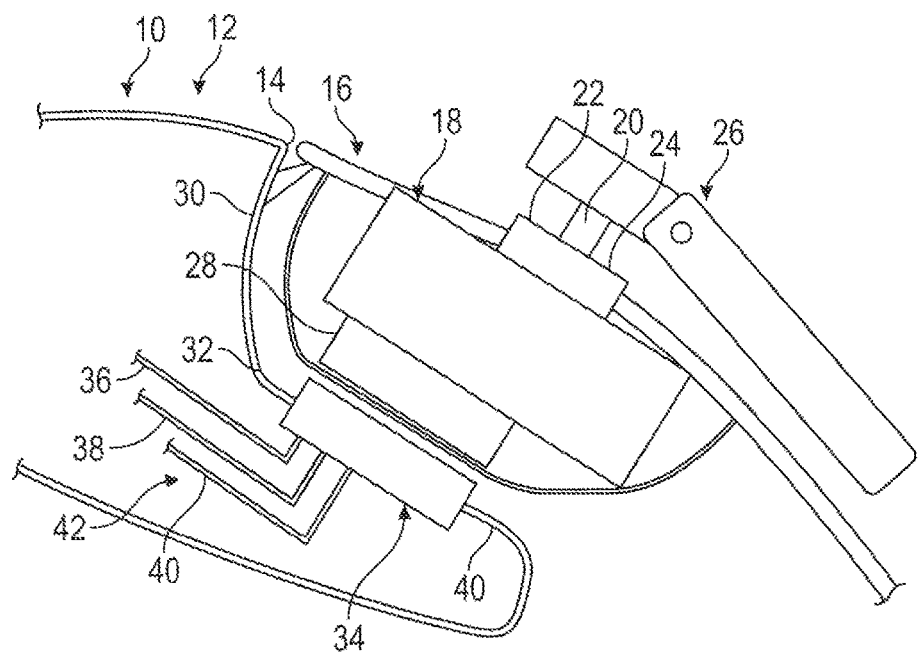
FIG. 1 is a schematic illustration of a wiper system of a vehicle in accordance with a first herein described embodiment.

The following detailed description is merely exemplary in nature and is not intended to limit the application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term system or module may refer to any combination or collection of mechanical and electrical hardware, software, firmware, electronic control component, processing logic, and/or processor device, individually or in any combination, including without limitation: application specific integrated circuit (ASIC), an electronic circuit, a processor (shared, dedicated, or group), memory that executes one or more software or firmware programs, a combinational logic circuit, and/or other suitable components that provide the described functionality.

Embodiments of the invention may be described herein in terms of functional and/or logical block components and various processing steps. It should be appreciated that such block components may be realized by any number, combination or collection of mechanical and electrical hardware, software, and/or firmware components configured to perform the specified functions. For example, an embodiment of the invention may employ various combinations of mechanical components, e.g., wiper arms, wiper elements/wiper blades, motor mountings, body components and glass; and electrical components, e.g., wiper motors, integrated circuit components, memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of mechanical and/or electronic systems, and that the vehicle systems described herein are merely exemplary embodiment of the invention.

For the sake of brevity, conventional components and techniques and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

Referring to FIG. 1 a vehicle 10, has a body portion 12 with a rear body opening 14 enclosed by a transparent body member, e.g., rear glass 16. While the herein described embodiments are presented in the context of a rear body opening and a rear glass wiper system, the embodiments may be adapted for use to drive a windshield wiper system, a headlamp wiper system or other wiper systems adapted for use on a vehicle.

While designated rear glass 16, the skilled person will appreciate that the rear glass 16 may be glass, Lexan®, polycarbonate, or other suitable substantially optically transparent material. The rear glass 16 may be fixed within the opening 14 or alternatively, the rear glass 16 may be mounted, for example by hinges (not depicted), to move relative to the opening 14 between an open position (not depicted) and a closed position. Furthermore, while the rear glass 16 is described as enclosing an opening 14 of the body, the opening 14 may be enclosed by a moveable body panel, such as a liftgate (not depicted in the embodiment of FIG. 1) and the rear glass 16 may enclose an opening within the liftgate. Within the liftgate, the rear glass 16 may be fixed or moveable.

Secured to the rear glass 16 is a wiper motor 18 with a drive shaft 20 that extends through an aperture 22 sealed by a grommet 24 in any of several known ways. The wiper motor 18 may be bonded to the rear glass 16 or otherwise secured to the rear glass 16, for example, by mechanical fasteners, or may be secured to a panel that is then secured to the rear glass 16. In this way, the wiper motor may be secured to the rear glass 16 in any suitable manner, several ways of which are known. A wiper arm 26 is secured to the drive shaft 20 for movement therewith to affect wiping of the rear glass 16 upon operation of the wiper motor 18.

The wiper motor 18 includes a wireless transceiver 28 that is coupled to the wiper motor 18 via power, ground and signal connections (not depicted) in FIG. 1. The transceiver 28 may be made integral with the wiper motor 18, contained within a common housing or enclosure as the wiper motor 18 or may be a separate component or module that is secured to the wiper motor 19. The wiper motor 18 and the transceiver 28 once secured to the rear glass 16 may be enclosed by a trim panel 28.

Within the opening 14 of the body 12, a header panel 30 is formed with an aperture 32 into which is secured a wireless transceiver 34 that is complimentary to the transceiver 28. The transceiver 34 is provided with power 36, ground 38 and signal 40 connections via a wire harness 42 routed within the header panel 30. The transceiver 34 may be secured within the aperture 32 via mechanical fasteners (threaded, rivets, clips and the like), bonding, or by any suitable means. Additionally, while the transceiver 34 itself is shown disposed within the aperture 32, the transceiver 34 may be disposed on a surface 44 of the panel 30, and the wire harness 42 is routed through aperture 32. Further alternatively, the transceiver 34 may be secured to a surface 46 of the panel 30 eliminating entirely the need for aperture 32, advantageously securing the transceiver 32 away from harsh environments and eliminating the passing wires or components through panel apertures.

The wiper motor implementation depicted in FIG. 1 allows wireless communication of power and control signals from the body 12 to the wiper motor 18 without a wire connection from the body 12 to the wiper motor 18, advantageously eliminating the need for wire pass through and routing in exposed areas from the body 12 to the wiper motor 18.

Figure 2:
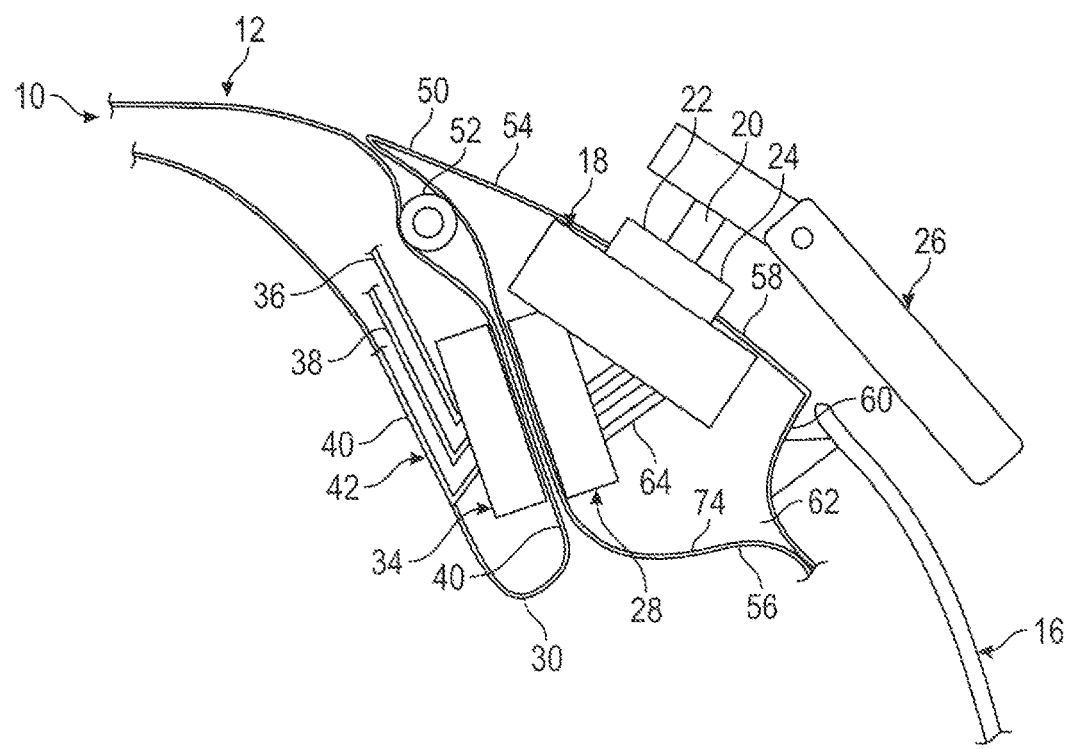
FIG. 2 is a schematic illustration of a wiper system of a vehicle in accordance with a second herein described embodiment.

FIG. 2 illustrates an alternative implementation wherein a lift gate panel 50 encloses the opening 14 via a hinge 52 that allows the lift gate panel 50 to be opened and closed. The lift gate panel 50 includes a header portion 54 formed by inner header panel 56 and outer header panel 58. The lift gate panel 50 further is formed to include an opening 60 enclosed by rear glass 16, which may be fixed or moveable.

The wiper motor 18 is mounted within an open section portion 62 formed by the inner header panel 56 and the outer header panel 58. The wiper motor 18 may be secured by any suitable manner, such as by mechanical fasteners, bonding and the like. Transceiver 28 is shown separate from the wiper motor 18 and coupled to the wiper motor 18 via a wired connection 64 that includes power 68, ground 70 and signal 72 connections. The transceiver 28 is mounted separately within the open section portion 62 so that with the lift gate panel 50 in a closed position (as depicted in FIG. 2), the transceiver 28 is positioned closely adjacent to transceiver 34. As further depicted in FIG. 2, the transceiver 34 is secured to the surface 40. The transceiver 28 is secured to a surface 74 of the inner header panel 56.

The transceivers 28 and 34 are arranged to be disposed in close proximity to permit wireless capacitive coupling (electrostatic induction) between metal electrodes (not depicted), or inductive coupling (electromagnetic induction) between coils of wire (not depicted) disposed respectively within the transceivers 28 and 34. In this manner, motive electrical power may be communicated from the transceiver 34 to the transceiver 28 to energize the wiper motor 18. The arrangement of transceiver 28 and 34 may be essentially open loop, in that transceiver 28 when energized couples power to transceiver 34 energizing the wiper motor 18, but without providing any data or signal indication that the wiper motor 18 is energized and operating. Alternatively, the transceivers 28 and 34 may be configured to communicate one or more data indicative of wiper motor 18 operation upon energization of the same.

Figure 3:
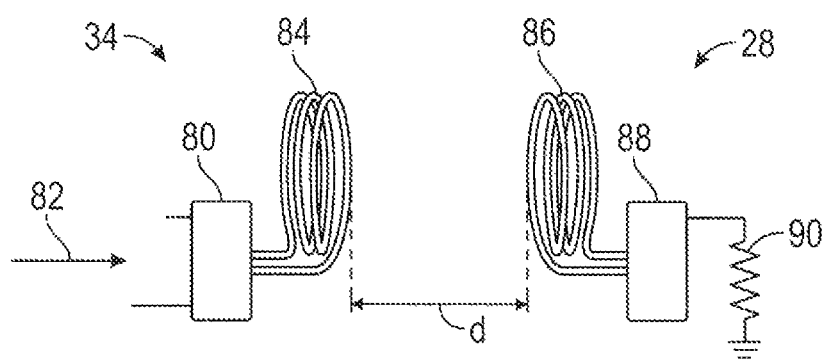
FIG. 3 is a schematic circuit diagram of a wireless transmitter/receiver that may be used in a wiper system such as depicted in FIGS. 1 and 2.

FIG. 3 depicts an exemplary arrangement of transceivers 28 and 34 utilizing inductive coupling. Transceiver 34 includes a signal generator 80 that is responsive to an input signal 82 to couple a driving signal to a primary coil 84. Transceiver 28 includes a secondary coil 86 that couples to a transformer/rectifier 88 that is coupled to provide electric power to a load 90, for example, the wiper motor 18.

In one exemplary implementation, the coupling may be done on the magnetic plane at a suitable frequency, and for example at a frequency of 13.56 Mhz. To communicate a bit of data from the transceiver 34 to the transceiver 28, a phase of the input signal 82 may be shifted. The phase shift is then detected by the transceiver 28 as either a 1 or 0 bit of data. Within the transceiver 28, the load impedance may be shifted. The load impedance shift may be detected within the transceiver 34, for example as a phase shift reflection in the primary coil 84, effectively providing an ability to communicate a 1 or 0 bit of data.

Figure 4:
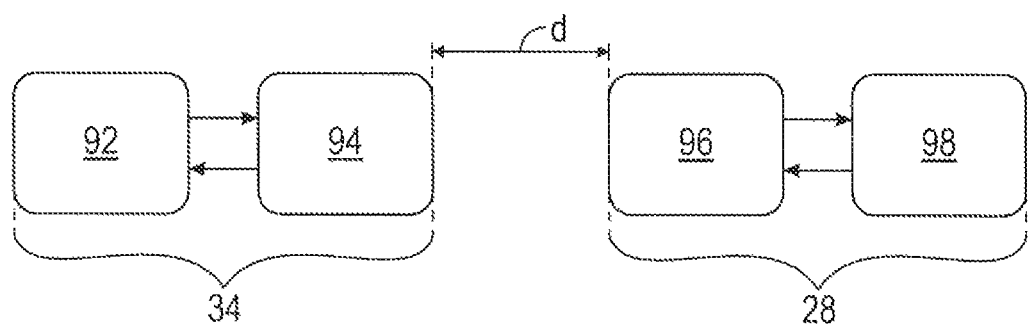
FIG. 4 is a functional block diagram of a wireless transmitter/receiver that may be used in a wiper system such as depicted in FIGS. 1 and 2.

The functional block diagram arrangement depicted in FIG. 4 of transceivers 28 and 34 further illustrate how the transceivers 28 and 34 may be arrange to communicate data in excess of single bit, such as control signals from the body 12 to the wiper motor 18, and status signals from the wiper motor 18 to the body 12.

As depicted, the transceiver 34 on the body 12 side may be configured to include a signal processor 92 operatively coupled to a transmit/receive element 94 that would include operatively coupled the coil 84 and a transformer and a signal generator/signal detector (not depicted). The transceiver 28 associated with the wiper motor 18 may similarly be configured to include a transmit/receive element 96 that would include the coil 86 operatively coupled to a signal detector/generator and transformer (not depicted) coupled to a signal processor 98.

The signal processor 92 may generate one or more data to be communicated from the body 12 to the wiper motor 18. The data may be modulated onto the signal communicated from the element 94 to the element 96, and the data may be decoded by the signal processor 98. The data may be modulated as complex data within the communicated signal using a suitable keying method, or may be modulated as serial bits of data communicated as phase shifted signals as discussed above. Likewise, the signal processor 98 may generate one or more data to be communicated from the wiper motor 18 to the body 12.

Yet additional advantages arise with the use of a wireless coupling of a wiper motor to the vehicle electrical system to permit an improved installation process, as the vehicle transceiver can be installed prior to the wiper motor installation allowing for a hidden connection, helping to hide wires and not to require wire to cross open areas, assisting in preventing damage to the wiring and improving initial product quality and long term reliability.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A wiper system comprising:
    a wiper motor having an output shaft and a wiper arm coupled to the output shaft for movement therewith;
    a first transceiver arranged to provide a wireless electric power signal and a wiper operation control signal; and
    a second transceiver wirelessly coupled to the first transceiver to receive the wireless electric power signal and the wiper operation control signal and further being coupled to the wiper motor to provide energizing electric power to the wiper motor such that the wiper motor has a torque producing output to drive at least one wiper assembly, wherein the wiper motor is configured to provide the torque producing output responsive to the wiper operation control signal.

2. The wiper system of claim 1, the first transceiver including a first coil and the second transceiver including a second coil, the wireless electric power signal and the wiper operation control signal being inductively coupled between the first coil and the second coil.

3. The wiper system of claim 1, the first transceiver and the second transceiver operable to communicate the wiper operation control signal with the wireless electric power signal.

4. The wiper system of claim 1, the first transceiver including a first processor and the second transceiver including a second processor, wherein the first and second processors are operable to communicate the wiper operation control signal there between via the first and second transceivers.

5. The wiper system of claim 1, the second transceiver and the wiper motor being integral.

6. The wiper system of claim 1, the second transceiver being coupled to the wiper motor by a wired connection.

7. A vehicle having a body portion including a body opening, the body opening being at least partially enclosed by a transparent body member, a wiper system including a wiper motor driving a wiper element arranged to wipe the transparent body member, the wiper system comprising:
    a first transceiver arranged to provide a wireless electric power signal and a wiper operation control signal; and
    a second transceiver wirelessly coupled to the first transceiver to receive the wireless electric power signal and the wiper operation control signal and further being coupled to the wiper motor to provide energizing electric power to the wiper motor such that the wiper motor has a torque producing output to drive at least one wiper assembly, wherein the wiper motor is configured to provide the torque producing output responsive to the wiper operation control signal.

8. The vehicle of claim 7, the first transceiver including a first coil and the second transceiver including a second coil, the wireless electric power signal and the wiper operation control signal being inductively coupled between the first coil and the second coil.

9. The vehicle of claim 7, the first transceiver including a first processor and the second transceiver including a second processor, wherein the first and second processors are operable to communicate the wiper operation control signal there between via the first and second transceivers.

10. The vehicle of claim 7, the first transceiver and the second transceiver operable to communicate the wiper operation control signal with the wireless electric power signal.

11. The vehicle of claim 7, the second transceiver and the wiper motor being integral.

12. The vehicle of claim 7, the second transceiver being coupled to the wiper motor by a wired connection.

13. The vehicle of claim 7, wherein the first transceiver is disposed on the body portion and the second transceiver is disposed on the wiper motor.

14. The vehicle of claim 7, the transparent body member being moveable relative to the body opening, the first transceiver being disposed on the body portion and the second transceiver being disposed on the transparent body member.

15. The vehicle of claim 7, a moveable body member enclosing the body opening, the moveable body member having an opening and the transparent body member enclosing the opening.

16. The vehicle of claim 15, the first transceiver being disposed on the body portion and the second transceiver being disposed on the moveable body member.

17. The vehicle of claim 15, the transparent body member being moveable relative to the opening, the first transceiver being disposed on the body portion and the second transceiver being disposed on the transparent body member.

18. The vehicle of claim 17, the transparent body member being moveable relative to the opening, the first transceiver being disposed on the body portion and the second transceiver being disposed on the moveable body member.

19. A method of powering a wiper motor of a wiper system of a vehicle, the method comprising:
- providing a first transceiver disposed on a body portion of the vehicle;
- providing a second transceiver operatively coupled to the wiper motor; and wirelessly communicating a wireless electric power signal and a wiper operation control signal from the first transceiver to the second transceiver to energize the wiper motor such that the wiper motor has a torque producing output to drive at least one wiper assembly, wherein the wiper motor is configured to provide the torque producing output responsive to the wiper operation control signal.

20. The method of claim 19, further comprising communicating a data signal in conjunction with the power signal.

* * * * *